United States Patent [19]

Dirkin

[11] Patent Number: 4,700,868
[45] Date of Patent: Oct. 20, 1987

[54] COMPOSITE PRESSURE VESSEL INCLUDING FLUID PORT WITH REPLACEABLE SEAL IN COMPOSITE SIDEWALL STRUCTURE AND METHOD OF CONSTRUCTING SUCH FLUID PORT

[75] Inventor: William Dirkin, Portage, Mich.

[73] Assignee: Pneumo Abex Corporation, Boston, Mass.

[21] Appl. No.: 845,650

[22] Filed: Mar. 28, 1986

[51] Int. Cl.$^4$ .................. B65D 25/02; B65D 25/38
[52] U.S. Cl. ................................ 220/465; 220/304; 222/131
[58] Field of Search .............. 220/5 R, 465, 304; 222/131, 568

[56] References Cited

U.S. PATENT DOCUMENTS

| | | | |
|---|---|---|---|
| 969,205 | 9/1910 | Shields | 220/465 |
| 970,095 | 9/1910 | McPheeters | 220/465 |
| 1,584,854 | 5/1926 | Dill | 220/465 |
| 1,878,327 | 9/1932 | Rimmelspacher | 220/304 |
| 2,090,668 | 8/1937 | Deutsch | 220/5 R |
| 2,198,315 | 4/1940 | Nyberg | 220/465 |
| 2,224,632 | 12/1940 | Giles | 220/465 |
| 3,112,234 | 12/1963 | Krupp | 220/3 |

Primary Examiner—George E. Lowrance
Attorney, Agent, or Firm—Renner, Otto, Boisselle & Lyon

[57] ABSTRACT

A composite pressure vessel including a fluid port extending through the composite sidewall structure formed by providing a radial hole through the sidewall structure for receipt of an externally removable porting plug. The porting plug is retained within the radial hole by threaded engagement in an internally threaded grommet which may either be incorporated into the composite windings of the sidewall structure or held in place against the exterior surface of the sidewall structure by local composite windings. At the inner end of the porting plug is a seal groove containing a ring seal which is sized to form a fluid-tight seal around a porting hole in a liner member in the interior of the sidewall structure to prevent fluid leakage between the porting plug and liner member. The inner diameter of the seal groove is formed by a reduced diameter end portion at the inner end of the porting plug, whereas the outer diameter of the seal groove is formed by a back-up ring surrounding such reduced diameter end portion in radial spaced relation therefrom. The back-up ring is preloaded against the liner member during threading of the porting plug into the grommet to ensure a tight fit between the back-up ring and liner member.

15 Claims, 2 Drawing Figures

U.S. Patent  Oct. 20, 1987  4,700,868
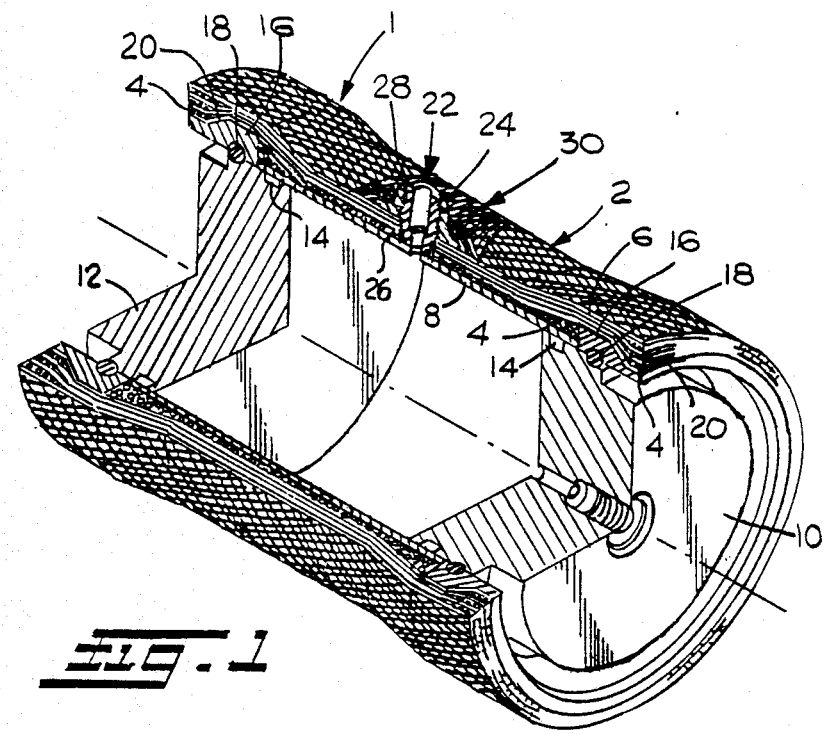
_FIG. 1_
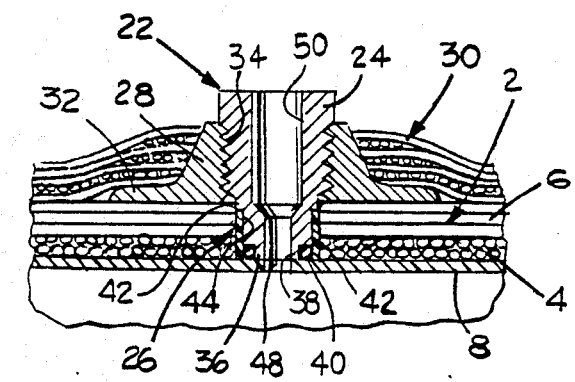
_FIG. 2_

COMPOSITE PRESSURE VESSEL INCLUDING FLUID PORT WITH REPLACEABLE SEAL IN COMPOSITE SIDEWALL STRUCTURE AND METHOD OF CONSTRUCTING SUCH FLUID PORT

BACKGROUND OF THE INVENTION

This invention relates generally as indicated to a composite pressure vessel including a fluid port with replaceable seal provided in the composite sidewall structure, and to the method of constructing such fluid port.

Pressure vessels such as are used in hydraulic or pneumatic actuators may be constructed of fiber reinforced composite materials to reduce the weight of the vessels without sacrificing strength. Such composite pressure vessels have included impermeable inner barrier liner members to prevent fluid seepage through the relatively porous composite materials. Such liner members may be fabricated from metals or organic materials, and may but need not be bonded to the inner wall of the pressure vessel.

Because of the permeability of such composite materials, and the necessary sealing liner when used to contain fluids under pressure, up to now it has been difficult to port fluid (including hydraulic fluids or gases) directly through the composite pressure vessel sidewall, as is often desirable.

SUMMARY OF THE INVENTION

With the foregoing in mind, it is a principal object of this invention to provide a composite pressure vessel with novel fluid port including a replaceable seal in the pressure vessel composite sidewall structure, and to the method of constructing such fluid port.

Another object is to provide a replaceable seal between an exteriorly removable porting plug and a sealing liner of a composite pressure vessel which eliminates any potential leakage problems and allows for limited movement between the pressure vessel and sealing liner.

These and other objects of the present invention may be achieved by providing a radial hole through the composite sidewall structure of the pressure vessel for receipt of a porting plug threadedly received in an internally threaded grommet which may either be incoporated into the composite windings of the sidewall structure or held in place against the exterior surface of the composite sidewall structure by local reinforcement material. Surrounding the inner end of the porting plug is a seal back-up ring defining therewith a seal groove for receipt of a replaceable O-ring seal. The seal back-up ring is desirably preloaded against the pressure vessel liner during insertion of the porting plug into the grommet to ensure a tight fit between the back-up ring and liner. Also, the seal groove is sized so that sufficient squeeze is exerted on the ring seal in the installed condition to prevent fluid leakage past the back-up ring. A porting hole is provided in the pressure vessel liner in coaxial alignment with a through passage in the porting plug.

To the accomplishment of the foregoing and related ends, the invention, then comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a schematic illustration of one form of composite pressure vessel, partly in section, to show a preferred form of fluid port in accordance with this invention extending through the composite sidewall structure of the pressure vessel; and FIG. 2 is an enlarged fragmentary longitudinal section through the fluid port and surrounding pressure vessel composite sidewall structure of FIG. 1.

DETAILED DESCRIPTION OF THE PREFERRED EMBODIMENT

Referring now in detail to the drawings, and initially to FIG. 1, there is schematically shown a pressure vessel 1 including a sidewall structure 2 made of fiber reinforced composite materials. Such a pressure vessel may be used, for example, in a hydraulic or pneumatic actuator for flight controls for aircraft and other high pressure applications.

The pressure vessel sidewall structure 2 desirably includes plural layers of circumferential or hoop stress windings 4 and longitudinal tension windings 6 made of a suitable composite fiber such as a high modulus graphite filament wound fiber impregnated with a suitable resin such as epoxy, polyester, polyimide, etc. The inner diameter (I.D.) of the pressure vessel is lined with an impermeable inner barrier liner member 8 which may be fabricated from metal or organic materials. Such liner member prevents fluid seepage through the relatively porous composite material of the pressure vessel sidewall structure, and may but need not be bonded to the inner diameter of the sidewall structure as desired.

The opposite ends of the pressure vessel 1 may be closed by separately formed end walls 10, 12. As shown, the liner member 8 and hoop and longitudinal windings 4, 6 surrounding same extend axially beyond the inner ends of the end walls, with suitable seals 14 disposed between the end walls and liner member to prevent fluid leakage therepast. The ends of the longitudinal tension windings 6 may be secured to the end walls 10, 12 as by means of separate ring retainers 16 connected to the respective end walls in any suitable manner, for example, by threaded connections or by means of retaining wires 18. Such annular ring retainers 16 may have external tapered ramp surfaces 20 facing in opposite directions away from each other for clamping engagement of the ends of the longitudinal tension windings 6 thereto as by means of additional circumferential hoop stress windings 4 interspersed between the longitudinal tension windings 6 radially outwardly of the ramp surfaces 20.

Heretofore, it has been difficult to port both hydraulic fluids or gases (hereafter fluid) directly through the pressure vessel sidewall 2 because of the permeability of the composite windings 4, 6 and the necessary sealing liner 8. However, the fluid port 22 of the present invention has made such porting through the composite sidewall structure relatively simple and easy as described hereafter.

Referring further to FIG. 1, and also to FIG. 2, the preferred form of fluid port 22 in accordance with this invention includes a porting plug 24 received in a radial hole 26 extending through the pressure vessel sidewall 2. The porting plug 24 is removably retained within the hole 26 by threading same into an internally threaded metal grommet 28 which may either be incorporated into the composite windings 4, 6 of the sidewall structure 2 during manufacture or held in place against the exterior surface of the composite sidewall structure by local reinforcement material 30 applied locally around the outturned flange 32 at the inner end of the grommet. Such local composite reinforcement material may be a mixture of circumferential and/or longitudinal (including bias ply) fibers 4, 6 of the type normally incorporated in such a composite pressure vessel.

The grommet 28 has an internally threaded longitudinally extending opening 34 therethrough of a diameter desirably approximately the same as the radial hole 26 through the composite sidewall structure 2, and such grommet is positioned over the hole 26 in coaxial alignment therewith and permanently attached to the composite sidewall structure in the manner previously described. Also, the radial hole 26 is desirably machined in the sidewall structure after the sidewall structure has been wound with the grommet incorporated into the composite windings or subsequently attached thereto by additional windings as previously described and the resulting assembly has been cured in an oven to cause the windings to bond together.

After the grommet 28 has been attached to the composite sidewall structure and before the porting plug 24 is inserted in place, the liner member 8 is inserted into the pressure vessel and bonded thereto or not as desired. Then the porting plug is inserted into the grommet. As clearly shown in FIG. 2, the porting plug is externally threaded for threaded receipt in the grommet. Also, the porting plug has a reduced diameter end portion 36 on the axial inner end thereof which forms the I.D. of a seal groove 38 for receipt of an elastomeric O-ring face seal 40. Surrounding the reduced diameter end portion 36 of the porting plug 24 in radially spaced relation therefrom is a seal back-up ring 42 made of Teflon or similar material which forms the O.D. of the seal groove 38.

The back-up ring 42 has a length greater than the depth of the ring seal groove 38 and extends axially beyond the groove along a cylindrical surface 44 on the exterior of the porting plug and into abutting engagement with a radial shoulder 46 on the porting plug for locating the back-up ring on the porting plug. By making the length of the back-up ring slightly greater than the axial distance between the radial shoulder 46 on the porting plug and the axial inner end thereof, when the porting plug is threaded into the grommet with its inner end engaging the seal liner 8, the back-up ring will be preloaded between the porting plug shoulder 46 and seal liner. This causes the back-up ring to be deformed slightly to conform to the exterior curvature of the seal liner in the region of the back-up ring to ensure a tight fit between the back-up ring and liner. Also, the relative sizes of the ring seal 40 and seal groove 38 are such that sufficient squeezing force is exerted on the ring seal in the installed position to form a fluid-tight seal with the seal liner around a porting hole 48 in the seal liner 8 and walls of the seal groove to prevent fluid leakage between the fluid port 22 and seal liner 8.

As shown, the porting hole 48 in the seal liner 8 is in coaxial alignment with a through passage 50 in the porting plug 24. Also, the diameter of the porting hole 48 in the seal liner is approximately the same as that of the porting plug passage at the inner end thereof. Such porting hole may be machined in the seal liner from the external porting plug end after the assembly has been completed as shown in FIG. 2.

As will be apparent, the provision of such a fluid port 22 including the ring seal 40 allows for a small amount of potential movement between the composite sidewall structure 2 and the seal liner 8, which is to be expected. Also, to replace the seal is a simple matter, it only being necessary to unscrew the porting plug 24 from the grommet 28 and remove the porting plug and ring seal and surrounding back-up ring 42 from the radial hole 26 in the composite sidewall structure for ease of replacement of the ring seal and re-assembly as required.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A composite pressure vessel comprising a sidewall structure of composite material, a liner member lining the interior of said sidewall structure, and a fluid port through said sidewall structure and liner member, said fluid port comprising a radial hole through said sidewall structure, an externally removable porting plug extending into said radial hole, a seal groove at the inner end of said porting plug, a ring seal in said seal groove, said liner member having a porting hole therethrough in coaxial alignment with a through passage through said porting plug, and said ring seal being sized to form a fluid-tight seal with said liner member around said porting hole to prevent fluid leakage between said porting plug and liner member, the inner diameter of said seal groove being formed by a reduced diameter end portion on the inner end of said porting plug, and the outer diameter of said seal groove being formed by a back-up ring surrounding said reduced diameter end portion of said porting plug in radially spaced relation therefrom, said back-up ring extending coaxially along said porting plug beyond said reduced diameter portion, said porting plug having an external cylindrical surface of a diameter greater than said reduced diameter portion extending axially outwardly of said reduced diameter portion, said back-up ring extending over said external cylindrical surface, and said porting plug having an external shoulder adjacent the axial outer end of said external cylindrical surface which is engaged by the axial outer end of said back-up ring for positioning said back-up ring on said porting plug with said back-up ring surrounding said reduced diameter portion.

2. The composite pressure vessel of claim 1 wherein the axial length of said back-up ring is somewhat greater than the axial distance between said shoulder and the inner end of said porting plug, whereby a preload force will be applied to said backup ring when said porting plug is fully inserted in said radial hole in said sidewall structure with the inner end of said porting plug engaging said liner member.

3. The composite pressure vessel of claim 2 wherein said back-up ring is made of a deformable material which conforms to the cylindrical contour of said liner member when said back-up ring is preloaded as aforesaid.

4. A composite pressure vessel comprising a sidewall structure of composite material, a liner member lining the interior of said sidewall structure, and a fluid port through said sidewall structure and liner member, said fluid port comprising a radial hole through said sidewall structure, an externally removable porting plug extending into said radial hole, a seal groove at the inner end of said porting plug, a ring seal in said seal groove, said liner member having a porting hole therethrough in coaxial alignment with a through passage through said porting plug, and said ring seal being sized to form a fluid-tight seal with said liner member around said porting hole to prevent fluid leakage between said porting plug and liner member, the inner diameter of said seal groove being formed by a reduced diameter end portion on the inner end of said porting plug, and the outer diameter of said seal groove being formed by a back-up ring slidably received over the inner end of said porting plug and surrounding said reduced diameter end portion of said porting plug in radially spaced relation therefrom, said back-up ring extending coaxially along said porting plug beyond said reduced diameter end portion.

5. The composite pressure vessel of claim 4 wherein said porting plug has an external cylindrical surface of a diameter greater than said reduced diameter end portion extending axially outwardly of said reduced diameter end portion, and said back-up ring is slidably received over said external cylindrical surface.

6. The composite pressure vessel of claim 5 wherein said fluid port further comprises an internally threaded grommet, said grommet having an outturned flange on the inner end thereof, and a plurality of layers of composite windings surrounding said outturned flange for permanently attaching said grommet to the composite material of said sidewall structure with said grommet in coaxial alignment with said radial hole in said sidewall structure, said porting plug being adapted to be threadedly received in said grommet with said ring seal contained in said seal groove at the inner end of said porting plug and said back-up ring slidably received over said external cylindrical surface, said porting plug being removable from said grommet to permit replacement of said ring seal.

7. The composite pressure vessel of claim 6 wherein said composite windings form part of the composite material of said sidewall structure.

8. The composite pressure vessel of claim 6 wherein said porting plug includes an inner end portion extending inwardly within said sidewall structure beyond the inner end of said grommet, and said back-up ring is located on said inner end portiton of said porting plug inwardly of said grommet.

9. A method of providing a fluid port in a composite sidewall structure of a composite pressure vessel comprising the steps of forming a radial hole in the composite material of the sidewall structure, inserting a liner member in the interor of the sidewall structure, and inserting a porting plug into the radial hole from the exterior of the sidewall structure, the liner member having a porting hole therethrough in coaxial alignment with a through passage through the porting plug, and the porting plug having a seal groove at the inner end thereof containing a ring seal sized to form a fluid-tight seal with the liner member around the porting hole upon insertion of the porting plug into the radial hole in the sidewall structure, the innder diameter of the seal groove being formed by a reduced diameter end portion on the inner end of the porting plug, and the outer diameter of the seal groove being formed by a back-up ring which is slidably inserted over the inner end of the porting plug in surrounding relation to the reduced diameter end portion before inserting the porting plug into the radial hole in the sidewall structure.

10. The method of claim 9 further comprising the step of preloading the back-up ring between the porting plug and the liner member during insertion of the porting plug into the radial hole in the sidewall structure to provide a tight fit between the back-up ring and liner member.

11. The method of claim 10 wherein the back-up ring is made of a deformable material which is caused to conform to the cylindrical contour of the liner member when the back-up ring is preloaded as aforesaid.

12. The method of claim 9 wherein the porting hole is formed in the liner member from the external porting plug end after the porting plug has been inserted into the radial hole in the sidewall structure.

13. The method of claim 9 further comprising the step of permanently affixing an internally threaded grommet to the sidewall structure in coaxial alignment with the radial hole in the sidewall structure prior to inserting the porting plug in the radial hole by applying a plurality of layers of composite windings around an outturned flange on the inner end of the grommet, and subsequently threading the porting plug into the grommet with the ring seal at the inner end thereof and the back-up ring slidably received over such inner end.

14. The method of claim 13 wherein the composite windings which are used to attach the grommet to the sidewall structure form part of the composite sidewall structure.

15. The method of claim 14 further comprising the step of unthreading the porting plug from the grommet, replacing the ring seal, and rethreading the porting plug in the grommet with the ring seal and back-up ring at the inner end of the porting plug.

* * * * *